US011220027B2

(12) United States Patent
Heath, III et al.

(10) Patent No.: US 11,220,027 B2
(45) Date of Patent: Jan. 11, 2022

(54) MANDREL FOR PROCESSING A COMPOSITE PART AND METHOD FOR FABRICATING A COMPOSITE PART

(71) Applicant: The Boeing Company, Chicago, IL (US)

(72) Inventors: Richard E. Heath, III, Chicago, IL (US); Richard A. Prause, Chicago, IL (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 16/163,759

(22) Filed: Oct. 18, 2018

(65) Prior Publication Data

US 2020/0122361 A1 Apr. 23, 2020

(51) Int. Cl.
*B29C 33/50* (2006.01)
*B29C 70/44* (2006.01)
(Continued)

(52) U.S. Cl.
CPC .......... *B29C 33/505* (2013.01); *B29C 33/405* (2013.01); *B29C 33/76* (2013.01);
(Continued)

(58) Field of Classification Search
CPC ............. B29L 2031/757; B29C 33/505; B29C 70/446; B29C 33/3814; B29C 33/405; B29C 33/485; B29C 33/76; B29C 44/14; B29C 70/66; B29C 70/025; B29C 44/445; B29C 41/40; B29C 53/74; B29C 53/82;
(Continued)

(56) References Cited

U.S. PATENT DOCUMENTS 6,325,958 B1 12/2001 Lombardi et al.
7,293,737 B2 11/2007 Engwal et al.
(Continued)

FOREIGN PATENT DOCUMENTS

DE 102009024182 B3 * 3/2011 ........... B22D 29/001

OTHER PUBLICATIONS

Translation of DE 102009024182 B3. (Year: 2011).*
(Continued)

*Primary Examiner* — Leith S Shafi
(74) *Attorney, Agent, or Firm* — McDonnell Boehnen Hulbert & Berghoff LLP

(57) ABSTRACT

A mandrel for processing a part is described that includes a solid mandrel body with an elastomeric material, and hollow micro-particles embedded within the solid mandrel body in a uniform distribution. The hollow micro-particles deform in response to a change in a processing environment resulting in a distribution of voids in the solid mandrel body. A method for fabricating a composite part is also described that includes placing a base composite layer into a cavity of a tooling surface, inserting the mandrel into the cavity, applying a skin to the mandrel and the base composite layer forming a package, enclosing the package in a vacuum bag and curing the base composite layer and the skin such that during curing the hollow micro-particles deform resulting in the distribution of voids in the solid mandrel body, and removing the mandrel from the cavity of the tooling surface following the curing.

20 Claims, 4 Drawing Sheets

(51) Int. Cl.
  *B29C 33/40* (2006.01)
  *B29C 33/76* (2006.01)
  *B29C 33/48* (2006.01)
  *B29L 31/30* (2006.01)
  *B29L 31/00* (2006.01)

(52) U.S. Cl.
  CPC .......... *B29C 70/446* (2013.01); *B29C 33/485* (2013.01); *B29L 2031/3076* (2013.01); *B29L 2031/757* (2013.01)

(58) Field of Classification Search
  CPC ... B64C 1/064; B64C 1/065; B32B 2307/306; B32B 2307/3065; B32B 2307/56; B32B 5/16; B32B 5/30; Y10T 428/249971; B29K 2105/165; Y10S 264/06
  See application file for complete search history.

(56) References Cited

U.S. PATENT DOCUMENTS

| | | | |
|---|---|---|---|
| 7,357,166 B2 | 4/2008 | Pham et al. | |
| 8,534,339 B2 | 9/2013 | Pham et al. | |
| 9,238,335 B2 | 1/2016 | Robins et al. | |
| 9,327,467 B2 | 5/2016 | Robins et al. | |
| 9,486,943 B1 | 11/2016 | Robins | |
| 2009/0246485 A1* | 10/2009 | Panse | B32B 5/22 428/201 |
| 2010/0151220 A1* | 6/2010 | Bowmar | E04F 15/16 428/220 |
| 2016/0168350 A1* | 6/2016 | Tseng | B32B 27/18 521/60 |
| 2016/0243730 A1 | 8/2016 | Robins et al. | |

OTHER PUBLICATIONS

Microspheres: Fillers Filled with Possibilities : Composites World, retrieved from https://www.compositesworld.com/articles/microspheres-fillers-filled-with-possibilities on Aug. 17, 2018.

Expanel Microspheres—a Technical Presentation, AkzoNobel, 2012.

* cited by examiner

MANDREL FOR PROCESSING A COMPOSITE PART AND METHOD FOR FABRICATING A COMPOSITE PART

FIELD

The present disclosure generally relates to methods and equipment for fabricating composite parts, and more particularly to, a mandrel tool used in curing composite parts that includes hollow micro-particles embedded within the body of the mandrel that deform in response to a change in a processing environment resulting in a distribution of voids in the mandrel tool.

BACKGROUND

Mandrels may be used to layup, compress and/or cure a variety of parts that may possess one or more curves, contours, or surface features to which the mandrel needs to conform. For example, in the aircraft industry, stringers or stiffeners used in a fuselage or wings may be required to conform to composite skins that may be contoured and/or have surface features such as localized ply pad-ups or drop-offs. Thus, tooling to create these shapes can be complex due to the requirements of the structured.

In a specific example, to co-cure or co-bond the stiffener, such as a hat or omega stringer, to the skin as mentioned above, the mandrel tool is placed inside a cavity of the stiffener, and usually is caused to expand to consolidate the composite during cure to generate an appropriate pressure on the composite. Then, for the mandrel to be extracted, the mandrel contracts after cure to a smaller shape to provide clearance for extraction.

In the past, mandrels have been formed from flexible materials that allow the mandrel surface to conform to part contours. However, solid mandrels may not provide uniform pressure, in the cross-section or along the length of the part, during curing. Other mandrels, such as vented bladders can leak during curing or may not apply consistent pressure during cure, which can create variations in stringer thickness in cross-section and along length.

Accordingly, there is a need for a lightweight, flexible mandrel that readily conforms to local part contours and which may be easily handled and removed after cure without need for special equipment. There is also a need for a lightweight flexible mandrel that is easily fabricated at low cost, is durable, and produces smooth part surface finishes.

SUMMARY

In one example, a mandrel for processing a part is described that comprises a solid mandrel body comprising an elastomeric material, and hollow micro-particles embedded within the solid mandrel body in a uniform distribution. The hollow micro-particles deform in response to a change in a processing environment resulting in a distribution of voids in the solid mandrel body.

In another example, a mandrel for processing a part is described that comprises a solid mandrel body comprising an elastomeric material, where the solid mandrel body comprises an internal elastomer core and an elastomer skin surrounding the internal elastomer core. The mandrel also comprises hollow micro-particles embedded within one of the internal elastomer core and the elastomer skin in a uniform distribution, and the hollow micro-particles deform based on one or more of (i) a threshold temperature and (ii) a threshold pressure applied to the solid mandrel body resulting in a distribution of voids in the solid mandrel body.

In another example, a method for fabricating a composite part is described. The method comprises placing a base composite layer into a cavity of a tooling surface, and inserting a mandrel into the cavity of the tooling surface such that the base composite layer is between the mandrel and the tooling surface. The mandrel comprises a solid mandrel body having an elastomeric material and hollow micro-particles embedded within the solid mandrel body in a uniform distribution, and the hollow micro-particles deform in response to a change in a processing environment resulting in a distribution of voids in the solid mandrel body. The method also comprises applying a skin to the mandrel and the base composite layer forming a package, and enclosing the package in a vacuum bag and curing the base composite layer and the skin. During curing the hollow micro-particles deform resulting in the distribution of voids in the solid mandrel body. The method also comprises removing the mandrel from the cavity of the tooling surface following the curing.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
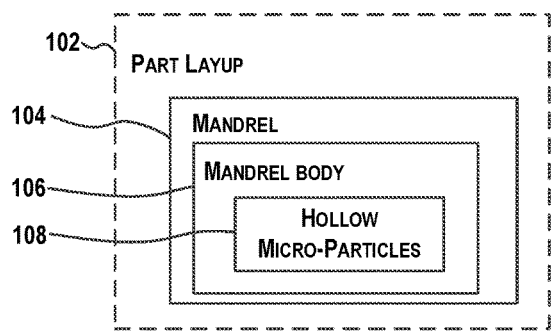
FIG. 1 illustrates a mandrel used to form and/or cure a part layup, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

A mandrel and method for forming hollow composite parts are described, in which the mandrel is formed from an elastomeric material and includes micro-scale voids. Voids can be created using polymer microspheres. A porosity, loading density, size, or composition of the microspheres can be varied to optimize a performance of the mandrel during cure of the composite part to ensure high quality composite parts are manufactured. The voids internal to the mandrel enable the mandrel to expand and compress during cure of the composite part to apply an even amount of pressure during cure.

Existing internal rubber mandrels for fabrication of closed structure (hollow) composite parts may not apply a consistent pressure during cure to the composite part, which can create variations in thickness in cross section and along length of the composite part. During cure, some existing mandrels expand or contract inconsistently due in part to coefficient of thermal expansion (CTE) effects and geometric constraints, and thus, do not provide a uniform pressure to the composite part if the mandrel is not shaped and configured to an appropriate density. The mandrel may expand more in thicker areas than in thinner areas, or in instances in which the mandrel includes large holes providing internal voids for compression, such mandrels are difficult to handle and may not allow for tailoring of properties. Non-uniform expansion of a mandrel during cure causes bulging or problems with composite material around the mandrel.

The example mandrel described herein with embedded micro-scale voids can be fabricated to have a uniform cross section with uniformly distributed micro-voids. The micro-voids can be created using low pressure hollow microspheres, and the microspheres crush resulting in voids, or low melting point hollow microspheres that melt at elevated temperatures resulting in voids.

A distribution of the micro-voids in an internal volume of the example mandrel described herein enables less complex mandrel fabrication due to a uniform cross section of the micro-voids as compared to other existing mandrels that include large discrete holes in the mandrel cross-section, and avoids risks associated with vented mandrels as there will be no risk of leaking.

Thus, within examples, a mandrel for processing a part is described that comprises a solid mandrel body comprising an elastomeric material, and hollow micro-particles embedded within the solid mandrel body in a uniform distribution. The hollow micro-particles deform in response to a change in a processing environment resulting in a distribution of voids in the solid mandrel body. Then, the voids created help to ensure a desired distribution of pressure during cure.

Referring now to FIG. 1, a mandrel 104 may be used to form and/or cure a part layup 102 comprising multiple plies (not shown) of fiber reinforced polymer resin. For example, multiple plies of fiber reinforced polymer plies are laid up over the mandrel 104 in order to form the plies into a desired part shape. The part layup 102 may partially or fully surround the mandrel 104, such that the mandrel 104 is at least substantially enclosed by the part layup 102.

Figure 11:
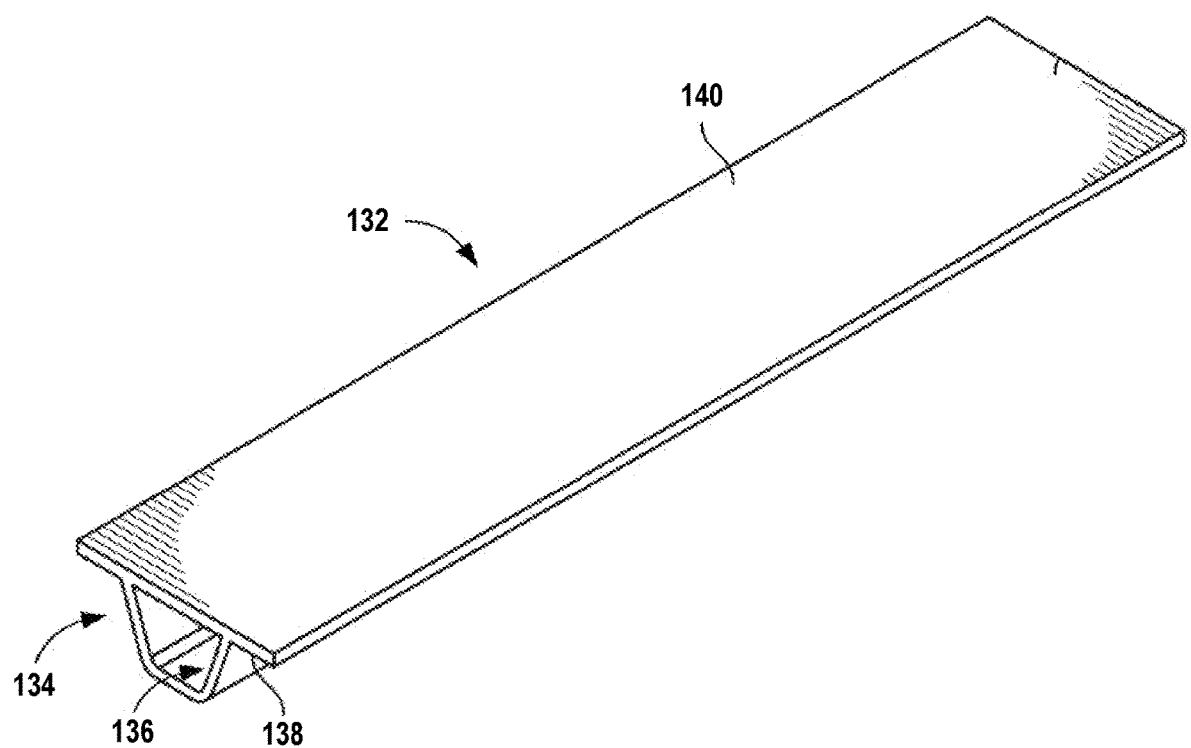
FIG. 11 illustrates an example stringer having an internal cavity by which the mandrel may be used for fabrication, according to an example implementation.

The part layup 102 may be cured to form any of a variety of composite components, structures, or parts that form full or partial enclosures having uniform or non-uniform cross sections along their lengths. For example, the cured part may comprise an integrally stiffened skin. As another example, the cured part may comprise a duct (not shown) or a conduit (not shown) used to transport fluids, such as, for example and without limitation, air ducts and fuel lines used in a wide variety of applications, including vehicles. An example of a composite component that may benefit from use of the mandrel 104 to form the part layup 102 is illustrated in FIG. 11 (described below).

The mandrel 104 includes a mandrel body 106 composed of an elastomeric material, and the mandrel body 106 is a solid component. The elastomeric material may include various materials, and the mandrel body 106 may be formed from, for example, without limitation, a rubber material, a composite material, a silicone material, and other combinations of materials. The elastomeric material may also include materials such as Teflon® (E.I. du Pont de Nemours and Company) coated silicone or hard rubber, and may be pliable to enable the elastomeric material to conform to various configurations.

The mandrel body 106 may increase or decrease in volume when the mandrel 104 is subjected to a change in a processing environment, such as to expand during a curing process of the part layup 102 to consolidate the composite laminate and generate an appropriate pressure on the laminate (e.g., to react to autoclave conditions or changing pressure and provide internal compaction). Then, for the mandrel 104 to be extracted, it can contract down after cure to a smaller size to provide clearance for extraction and to be withdrawn from the part layup 102 either after the part layup 102 is compacted and/or cured.

The mandrel body 106 is a solid body, which provides a stronger structure upon which the part layup 102 is provided.

The mandrel body 106 includes hollow micro-particles 108 embedded within the mandrel body 106 in a uniform distribution. The hollow micro-particles 108 deform in response to a change in a processing environment resulting in a distribution of voids in the mandrel body 106. The voids further enable the mandrel body 106 to be flexible and increase or decrease in volume when the mandrel 104 is subjected to the change in the processing environment.

Within examples, the change in the processing environment includes a change in temperature (e.g., the cure temperature of the composite component), and thus, the hollow micro-particles 108 deform based on a threshold temperature applied to the solid mandrel body 106 resulting in a distribution of voids in the solid mandrel body 106. An example threshold temperature may be within a range of about 200° F. to 400° F. Other threshold temperatures may be applicable as well based on the type of elastomeric material used and the type of optionally included hollow micro-particles 108 used, such as within a range of about 100° F. to 200° F., a range of about 150° F. to 300° F., a range of about 250° F. to 350° F., etc. Within further examples, the change in the processing environment includes a change in pressure, and thus, the hollow micro-particles 108 deform based on a threshold pressure applied to the solid mandrel body 106 resulting in a distribution of voids in the solid mandrel body 106. An example threshold pressure may be within a range of about 100-200 psi.

The hollow micro-particles 108 can include polymer microspheres, or other collapsible microspheres. The polymer microspheres may include microspheres that crush under a threshold pressure resulting in the distribution of voids. The polymer microspheres may additionally or alternatively include microspheres that melt under a threshold temperature resulting in the distribution of voids. The polymer microspheres may include microspheres that melt under a threshold temperature resulting in the distribution of voids with residue of the polymer microspheres remaining.

As a result, deformation of the hollow micro-particles 108 (either under application of a threshold temperature or threshold pressure) cause the hollow micro-particles 108 to deform and act like a void in an internal volume of the mandrel 104. The deformation may be a melting, a shrinking in size, or a breaking of the microsphere, which in some instances, may result in some residue of the microsphere remaining. After first exposure to elevated temperatures, the voids are then present in the mandrel 104, and the mandrel 104 is reusable for future processing as a resilient/elastomeric component.

The hollow micro-particles 108 may range in size from about 0.1 µm to about 300 µm in diameter, and generally have a shape of a sphere. Other sizes or shapes are possible as well, such as between 1 µm to 100 µm in diameter, 10 µm to 50 µm in diameter, 100 µm to 200 µm in diameter, etc. When integrated into the mandrel body 106, the hollow micro-particles 108 provide a variety of enhancements and improvements including low density, improved dimensional stability, increased impact strength, smoother surface finish, greater thermal insulation, easier machinability, faster cycle times, and cost savings. The hollow micro-particles 108 may comprise a wide variety of materials, including ceramics, plastic, glass, polymers, and metals and their properties can be tailored so that the hollow micro-particles 108 create micro-voids within elastomer base material of the mandrel 104 when subjected to the change in the processing environment.

Within some examples, the mandrel body 106 includes an elongated mandrel body, and the hollow micro-particles 108 are embedded within the mandrel body 106 in the uniform distribution axially and along a length of the mandrel body 106. The elongated mandrel body is useful for creating a mandrel of a size and shape as needed for a part, such as a stringer. The uniform distribution of the hollow micro-particles 108 embedded within the solid mandrel body results in the distribution of voids being, for example, about 10% to about 30% void area in the solid mandrel body following creation of the micro-voids. Other density values of voids in the mandrel body 106 are possible as well, such as between about 5% to 10% void area, 10% to 20% void area, 15% to 25% void area, 25% to 40% void area, etc. An amount of void area in the mandrel body 106 is based on an amount of the hollow micro-particles 108 embedded within the solid mandrel body 106, and the amount of void area is related to a desired compression of the solid mandrel body 106.

Figure 2:
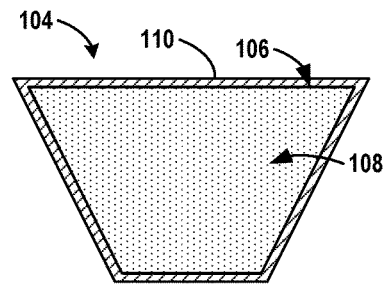
FIG. 2 illustrates an end cross-sectional view of the mandrel, according to an example implementation.

FIG. 2 illustrates an end cross-sectional view of the mandrel 104, according to an example implementation. In FIG. 2, the mandrel 104 is an upside down hat configuration to assist with former a composite stringer for an airplane. The mandrel 104 is shown to include a film 110 positioned around an exterior of the solid mandrel body 106 to provide a smooth exterior surface, although the film 110 is optional. In other examples, a casing or sheath may be used instead of the film 110. Use of the film 110 (or other casing/sheath) may be beneficial to provide a smooth exterior surface in the event that any hollow micro-particles 108 are on an exterior surface of the mandrel 104. The film 110 may be flexible and responsive to dimensional changes in the mandrel 104. The hollow micro-particles 108 are illustrated in a uniform distribution throughout the interior of the mandrel body 106.

Figure 3:
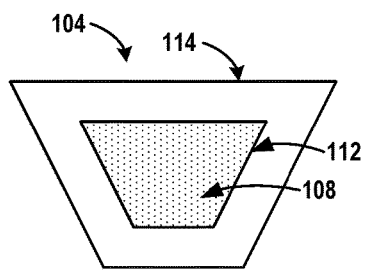
FIG. 3 illustrates an end cross-sectional view of the mandrel, according to another example implementation.

FIG. 3 illustrates an end cross-sectional view of the mandrel 104, according to another example implementation. In FIG. 3, the solid mandrel body 106 of the mandrel 104 includes an internal elastomer core 112 with the hollow micro-particles 108 embedded within the internal elastomer core 112 in the uniform distribution, and an elastomer skin 114 surrounding the internal elastomer core 112. The elastomer skin 114 includes no hollow micro-particles.

Figure 4:
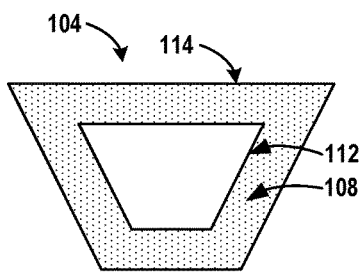
FIG. 4 illustrates an end cross-sectional view of the mandrel, according to another example implementation.

FIG. 4 illustrates an end cross-sectional view of the mandrel 104, according to another example implementation. In FIG. 4, the solid mandrel body 106 of the mandrel 104 includes the internal elastomer core 112 with no hollow micro-particles, and the elastomer skin 114 surrounding the internal elastomer core 112. The elastomer skin 114 includes the hollow micro-particles 108 embedded within the elastomer skin 114 in the uniform distribution.

Figure 5:
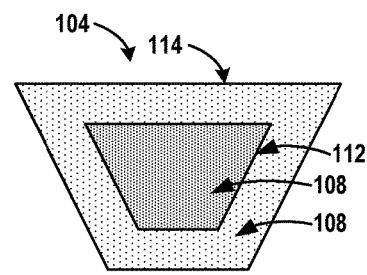
FIG. 5 illustrates an end cross-sectional view of the mandrel, according to another example implementation.

FIG. 5 illustrates an end cross-sectional view of the mandrel 104, according to another example implementation. In FIG. 5, the solid mandrel body 106 of the mandrel 104 includes the internal elastomer core 112 and the elastomer skin 114 surrounding the internal elastomer core 112. In the example shown in FIG. 5, each of the internal elastomer core 112 and the elastomer skin 114 includes the hollow micro-particles 108 embedded therein at respective different uniform distributions. Thus, the internal elastomer core 112 and the elastomer skin 114 will have different densities allowing for different expansion and contraction amounts.

As shown in FIGS. 3-5, the hollow micro-particles 108 are embedded within one of the internal elastomer core 112 and the elastomer skin 114 in a uniform distribution, and the hollow micro-particles 108 deform based on one or more of (i) a threshold temperature and (ii) a threshold pressure applied to the solid mandrel body 106 resulting in a distribution of voids in the solid mandrel body 106. The hollow micro-particles 108 can also be embedded within both of the internal elastomer core 112 and the elastomer skin 114 in different (or the same) distributions as well. An amount of distribution of hollow micro-particles 108 embedded within both of the internal elastomer core 112 and the elastomer skin 114 can be optimized to achieve a desired performance under cure. Thus, the internal elastomer core 112 may include no hollow micro-particles 108 and the elastomer skin 114 may include a percentage of hollow micro-particles 108. As another option, the elastomer skin 114 may include no hollow micro-particles 108 and the internal elastomer core 112 may include a percentage of hollow micro-particles 108. Any combination of the elastomer skin 114 and the internal elastomer core 112 having hollow micro-particles 108 can be used.

Thus, the example configurations shown in FIGS. 3-5 represent a dual density mandrel. In examples where the hollow micro-particles are embedded within one of the internal elastomer core 112 and the elastomer skin 114, the other may be a solid elastomer. For example, in FIG. 3, the elastomer skin 114 is a solid elastomer while the internal elastomer core 112 includes hollow micro-particles embedded therein. Similarly, in FIG. 4, the internal elastomer core 112 is a solid elastomer while the elastomer skin 114 includes hollow micro-particles embedded therein.

Figure 6:
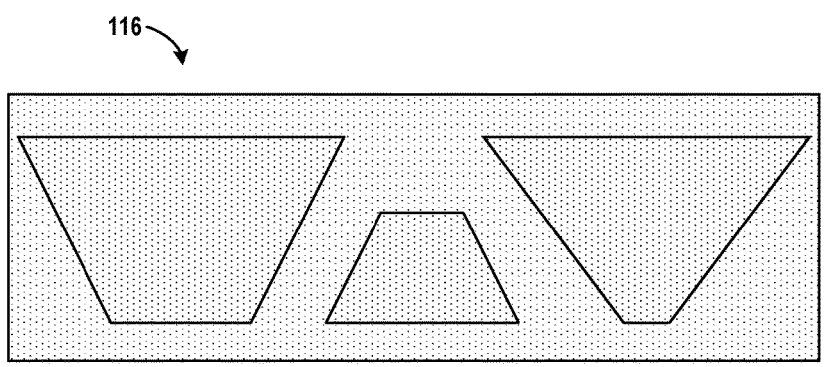
FIG. 6 illustrates a block of elastomer including embedded micro-particles, and an outline of example mandrels to cut out of the block, according to an example implementation.

FIG. 6 illustrates a block 116 of elastomer including embedded micro-particles, and an outline of example mandrels to cut out of the block 116, according to an example implementation. In one example, the block 116 of elastomer can be fabricated with embedded micro-particles (which can be subjected to pressure and/or temperature thresholds to create the internal micro-voids), and then custom mandrel cross sections can be machined/cut out of the block. Manufacturing of the mandrel 104 may then be less expensive and may reduce non-recurring tooling costs. Manufacturing of the mandrel 104 may also be faster as compared to vented bladders, as well as provide cost avoidance from eliminating a risk of leaks associated with vented bladders.

In addition, mandrels are normally fabricated using a casting, however, the mandrel 104 described herein may be manufactured as shown in FIG. 6 without casting to make mandrels of different geometries. Again, this can help to lower manufacturing costs of the mandrel 104.

Thus, the mandrel 104 can be fabricated by mixing the hollow micro-particles 108 with silicon to achieve a uniform distribution of the hollow micro-particles 108 within the silicon resulting in a silicon slurry mix, and then positioning the silicon slurry mix into a mold. The mold can be any shape, such as that of the block 116 shown in FIG. 6. Following, the mold is cured, and the mandrel 104 is cut from the mold. If needed, the film 110 can be positioned around an exterior of the mandrel 104 to provide a smooth exterior surface.

In operation for curing a composite part, the mandrel 104 will grows in size due to coefficient of thermal expansion (CTE) effects, which creates pressure inside the trapped volume of a hollow part. In an example, a 20% expansion may be experienced at 360° F., which generate 90 psi. With the embedded hollow micro-particles 108 being compressed due to the applied pressure and temperature, micro-voids are then generated creating a less dense internal volume of the mandrel 104. This enables the mandrel 104 to compress under pressure as a result of the micro-voids. In an example, a 10% compression may be experienced at 90 psi. Compression of the mandrel 104 helps during cure of the composite part so that the mandrel 104 does not push the composite part away and cause bulging.

In an example use case, the mandrel 104 may be used for curing composite hat stiffeners for an aircraft. Hat stiffeners are commonly used in composite structures, and tooling to create these shapes can be complex due to requirements of the structure. To co-cure or co-bond the hat stiffener to a skin, the mandrel 104 is placed inside a cavity of the hat stiffener. The mandrel 104 expands to consolidate the composite laminate during cure to generate an appropriate pressure on the laminate. Then, the mandrel 104 contracts down after cure to a smaller shape to provide clearance for extraction. The mandrel 104 is designed to control both the expansion and stiffness of the mandrel 104 through the use of the uniformly distributed hollow micro-particles 108 in the mandrel 104.

Thus, during cure, the mandrel 104 provides an even pressure distribution across the hat/skin cross section, and pressure generated by the mandrel 104 substantially matches external pressure of a processing environment in which the part is curing (e.g, autoclave pressure, ambient pressure, etc.). After cure, the mandrel 104 decreases in size than the hat stiffener cured geometry allowing removal.

Figure 7:
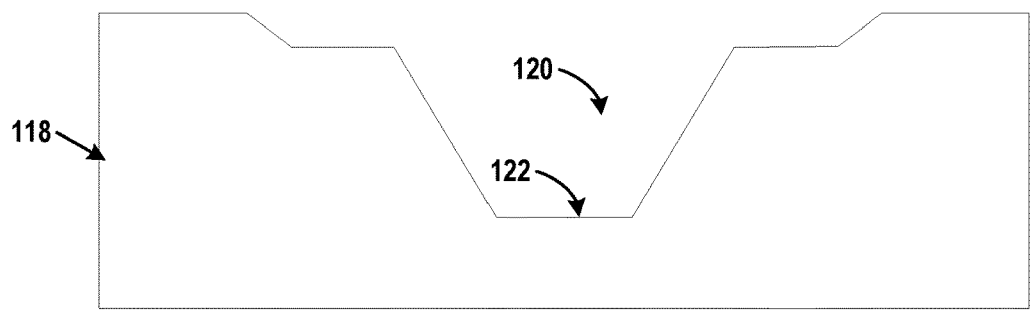
FIG. 7 illustrates an end cross-sectional view of a tool used in the fabrication of the composite part, according to an example implementation.

FIGS. 7-10 illustrate an example process flow for fabrication of a composite part, according to an example implementation. The illustrations in FIGS. 7-10 illustrate end cross-sectional views of elements used in the fabrication of the composite part. Initially, as shown in FIG. 7, a tool 118 is shown that includes a cavity 120 and a tooling surface 122. The cavity 120 is shaped and sized according to a hollow cavity as desired for the composite part.

Figure 8:
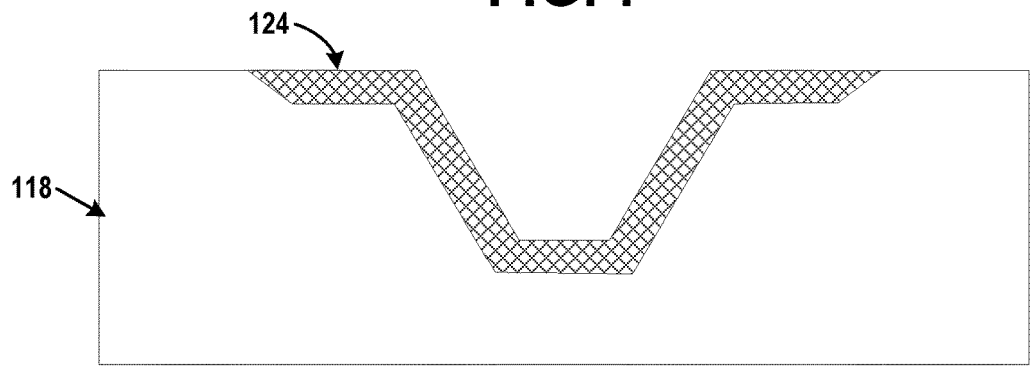
FIG. 8 illustrates an end cross-sectional view of a base composite layer placed into the cavity of the tool, according to an example implementation.
Figure 9:
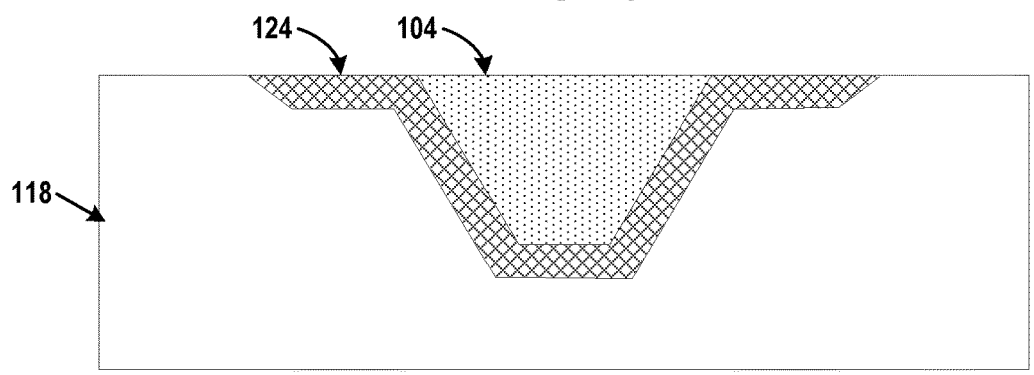
FIG. 9 illustrates an end cross-sectional view of the mandrel inserted into the cavity of the tool, according to an example implementation.

Next, as shown in FIG. 8, a base composite layer 124 is placed into the cavity 120 and onto the tooling surface 122. Following, as shown in FIG. 9, the mandrel 104 is inserted into the cavity 120 of the tooling surface 122 such that the base composite layer 124 is between the mandrel 104 and the tooling surface 122.

Figure 10:
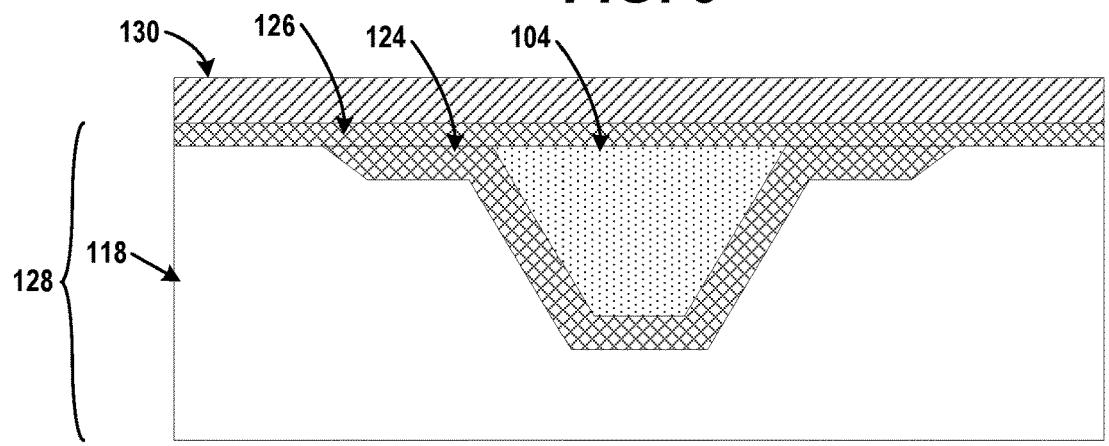
FIG. 10 illustrates an end cross-sectional view of a skin applied to the mandrel and the base composite layer forming a package, according to an example implementation.

As shown in FIG. 10, a skin 126 is applied to the mandrel 104 and the base composite layer 124 forming a package 128. Then, the package 128 is enclosed in a vacuum bag 130, and the base composite layer 124 and the skin 126 are co-cured. During curing, the hollow micro-particles 108 of the mandrel 104 deform resulting in the distribution of voids in the solid mandrel body 106, allowing the mandrel 104 to expand and not cause bulging of the skin 126. For example, the mandrel 104 can expand into volume of the voids that are internal to the mandrel 104. Following curing, the mandrel 104 is removed from the cavity 120 of the tooling surface 122.

The mandrel 104 thus applies pressure to the base composite layer 124 and the skin 126 during layup and curing so as to form a hat stiffener. The mandrel 104 defines and maintains a shape of the hat stiffener during curing, with substantially even pressure and without substantial distortion. As shown, the mandrel 104 has a substantially trapezoidal cross sectional shape, generally matching that of the hat stiffener. However, the mandrel 104 may possess any of a variety of cross sectional shapes depending on an application and a particular shape of the composite structure layup. The mandrel 104 also includes a generally solid body that extends a length of the hat stiffener.

During the thermal cycling used to effect co-curing of the base composite layer 124 and the skin 126, substantially uniform expansion of the mandrel 104 occurs, and the voids created by the hollow micro-particles provide volume into which the expansion may occur.

FIG. 11 illustrates an example stringer 132 (e.g., composite resin part) having an internal cavity by which the mandrel 104 may be used for fabrication, according to an example implementation. For example, and without limitation, the mandrel 104 and curing method may be used in fabrication of a fiber reinforced composite resin stringer as shown in FIG. 11. In one arrangement, the stringer 132 may comprise a multi-ply layup of prepreg. In the illustrated arrangement, the stringer 132 comprises a hat section 134 forming an internal stringer cavity 136, a pair of laterally extending flange sections 138, and a substantially flat skin section 140 that is consolidated together with the flange sections 138 during curing. As those of ordinary skill in the art will recognize, alternative stringer geometries are possible.

The stringer 132 may be fabricated using the mandrel 104, as described in FIGS. 7-10. After curing, the part layup 102 of FIG. 1 forms the stringer 132. The mandrel 104 fills the stringer cavity 136 that is a hollow trapezoidal space.

Example composite material used for the stringer 132 may be generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the mandrel 104 (or mold) to pre-form the tape or fabric into a desired shape of the stringer 132 as defined by the mandrel 104. The stringer 132 could be any suitable dimension to provide various degrees of reinforcement, and could comprise any number of plies of prepreg tape or fabric.

The mandrel 104 enables fabrication of high quality stringers by applying consistent internal pressure during fabrication. The mandrel 104 also enables easier extraction after cure due to increased compression abilities from the micro-voids.

In addition, the mandrel 104 is not just useful during curing of the stringer 132, but also, the mandrel 104 is consistent in size at room temperatures as well to help provide a consistent structure on which the fibers can be positioned. Small changes in temperature will not affect positioning of the fibers through use of the mandrel 104 during the assembly of the stringer (or other example part) prior to cure.

Within the examples described above, the mandrel 104 provides for improved fabrication of closed composite structures (such as hat stringers) due to the mandrel formed from an elastomeric material embedded with micro-voids. By selecting properties of the hollow micro-particles 108 (such as degree of loading, density, size, composition, etc.), a performance of the mandrel 104 can be optimized to ensure high quality part fabrication. The mandrel 104 can also be used in other applications for fabrication of other types of composite structures.

Figure 12:
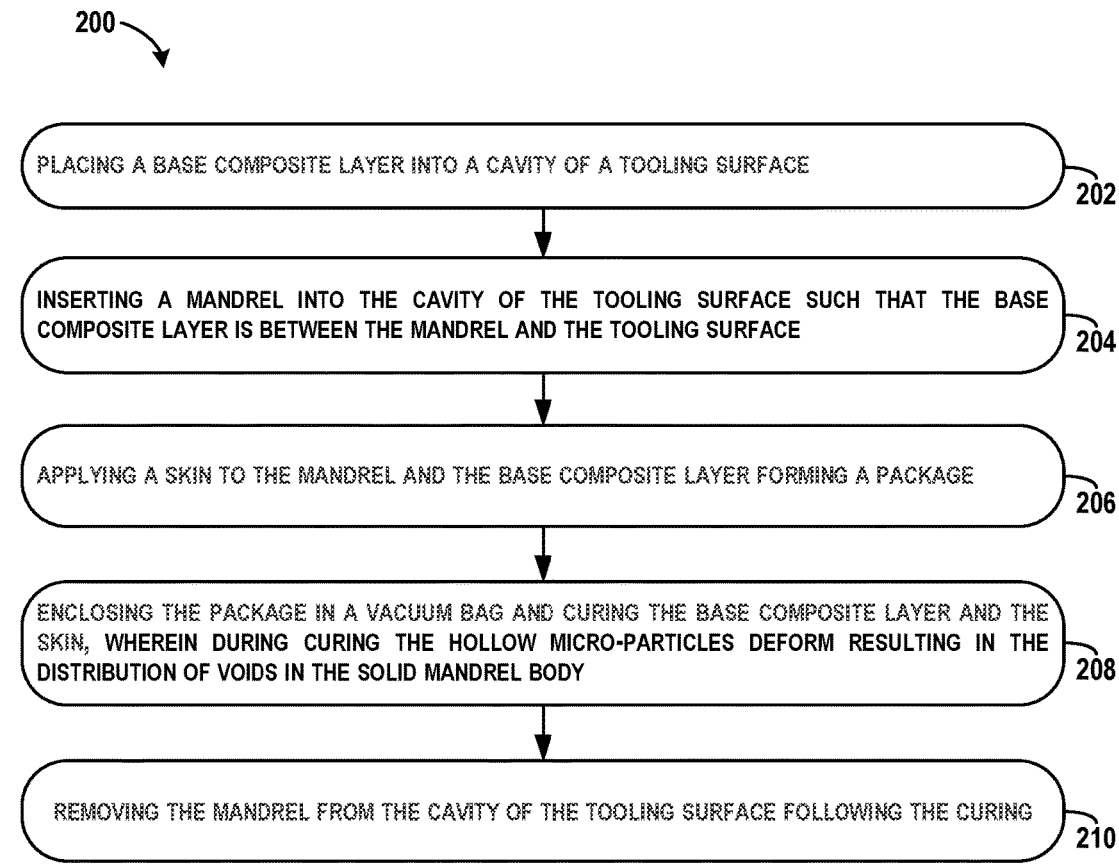
FIG. 12 shows a flowchart of an example method for fabricating a composite part, according to an example implementation.

FIG. 12 shows a flowchart of an example method 200 for fabricating a composite part (e.g., such as the stringer 132), according to an example implementation. Method 200 shown in FIG. 12 presents an example of a method that, for example, could be used with the mandrel 104 shown in FIG. 1, for example, and may be performed with components illustrated in FIG. 1. In some examples, components may be arranged to be adapted to, capable of, or suited for performing the functions, such as when operated in a specific manner. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes placing the base composite layer 124 into the cavity 120 of the tooling surface 122. At block 204, the method 200 includes inserting the mandrel 104 into the cavity 120 of the tooling surface 122 such that the base composite layer 124 is between the mandrel 104 and the tooling surface 122. The mandrel 104 comprises a solid mandrel body 106 having an elastomeric material and the hollow micro-particles 108 embedded within the solid mandrel body 106 in a uniform distribution. The hollow micro-particles 108 deform in response to a change in a processing environment resulting in a distribution of voids in the solid mandrel body 106.

At block 206, the method 200 includes applying the skin 126 to the mandrel 104 and the base composite layer 124 forming the package 128. At block 208, the method 200 includes enclosing the package 128 in the vacuum bag 130 and curing the base composite layer 124 and the skin 126. During curing, the hollow micro-particles 108 deform resulting in the distribution of voids in the solid mandrel body 106. At block 210, the method 200 includes removing the mandrel 104 from the cavity 120 of the tooling surface 122 following the curing.

Figure 13:
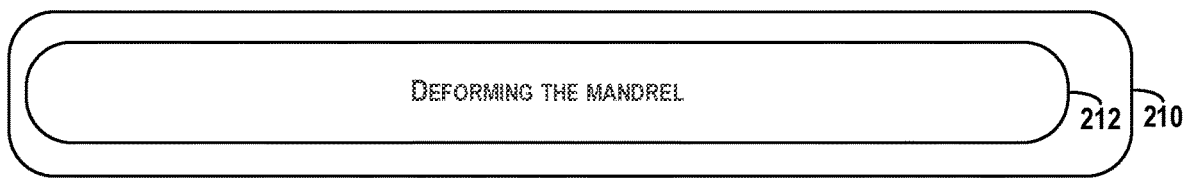
FIG. 13 shows a flowchart of an example method for removing the mandrel as shown in FIG. 12, according to an example implementation.

FIG. 13 shows a flowchart of an example method for removing the mandrel 104 as shown in block 210 of FIG. 12, according to an example implementation. At block 212, functions include deforming the mandrel 104.

As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), apparatus(es), and method(s) disclosed herein include a variety of components, features, and functionalities. It should be understood that the various examples of the system(s), apparatus(es), and method(s) disclosed herein may include any of the components, features, and functionalities of any of the other examples of the system(s), apparatus(es), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A mandrel for processing a part, comprising:
   a solid mandrel body comprising an elastomeric material, wherein the solid mandrel body comprises:
   an internal elastomer core; and
   an elastomer skin surrounding the internal elastomer core; and
   hollow micro-particles embedded within each of the internal elastomer core and the elastomer skin of the solid mandrel body at respective different uniform distributions, wherein the hollow micro-particles deform in response to a change in a processing environment resulting in a distribution of voids in the solid mandrel body, wherein the hollow micro-particles are collapsible microspheres.

2. The mandrel of claim 1, wherein the solid mandrel body includes an elongated mandrel body, and wherein the hollow micro-particles are embedded within the solid mandrel body in the uniform distribution axially and along a length of the solid mandrel body.

3. The mandrel of claim 1, wherein the collapsible microspheres include polymer microspheres.

4. The mandrel of claim 3, wherein the polymer microspheres include microspheres that crush under a threshold pressure resulting in the distribution of voids.

5. The mandrel of claim 3, wherein the polymer microspheres include microspheres that melt under a threshold temperature resulting in the distribution of voids.

6. The mandrel of claim 3, wherein the polymer microspheres include microspheres that melt under a threshold temperature resulting in the distribution of voids with residue of the polymer microspheres remaining.

7. The mandrel of claim 1, wherein the uniform distribution of the hollow micro-particles embedded within the solid mandrel body results in the distribution of voids being about 10% to about 30% void area in the solid mandrel body.

8. The mandrel of claim 1, wherein an amount of void area is based on an amount of the hollow micro-particles embedded within the solid mandrel body, and wherein the amount of void area is related to a desired compression of the solid mandrel body.

9. The mandrel of claim 1, wherein the change in the processing environment includes a change in temperature, and wherein the hollow micro-particles deform based on a threshold temperature applied to the solid mandrel body resulting in a distribution of voids in the solid mandrel body.

10. The mandrel of claim 1, wherein the change in the processing environment includes a change in pressure, and wherein the hollow micro-particles deform based on a threshold pressure applied to the solid mandrel body resulting in a distribution of voids in the solid mandrel body.

11. The mandrel of claim 1, further comprising:
a film positioned around an exterior of the solid mandrel body to provide a flexible exterior surface.

12. A mandrel for processing a part, comprising:
a solid mandrel body comprising an elastomeric material, the solid mandrel body comprising:
an internal elastomer core; and
an elastomer skin surrounding the internal elastomer core; and
hollow micro-particles embedded within each of the internal elastomer core and the elastomer skin at respective different uniform distributions, wherein the hollow micro-particles deform based on one or more of (i) a threshold temperature and (ii) a threshold pressure applied to the solid mandrel body resulting in a distribution of voids in the solid mandrel body, wherein the hollow micro-particles are collapsible microspheres.

13. The mandrel of claim 12, wherein the collapsible microspheres crush under the threshold pressure resulting in the distribution of voids.

14. The mandrel of claim 12, wherein the collapsible microspheres melt under the threshold temperature resulting in the distribution of voids.

15. The mandrel of claim 12, wherein the collapsible microspheres range in size from 10 μm to 50 μm in diameter.

16. The mandrel of claim 12, wherein upon collapse of the collapsible microspheres, the distribution of voids becomes present in the solid mandrel body.

17. The mandrel of claim 12, further comprising:
a film positioned around an exterior of the solid mandrel body to provide a flexible exterior surface.

18. The mandrel of claim 1, wherein the collapsible microspheres range in size from 10 μm to 50 μm in diameter.

19. The mandrel of claim 1, wherein upon collapse of the collapsible microspheres, the distribution of voids becomes present in the solid mandrel body.

20. The mandrel of claim 12, wherein the collapsible microspheres include polymer microspheres.

* * * * *